(12) United States Patent
Callahan et al.

(10) Patent No.: US 7,537,231 B2
(45) Date of Patent: May 26, 2009

(54) BICYCLE FORK ASSEMBLY

(75) Inventors: Jean-Luc Callahan, San Jose, CA (US); Jan Talavasek, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 62 days.

(21) Appl. No.: 11/769,480

(22) Filed: Jun. 27, 2007

(65) Prior Publication Data

US 2008/0029993 A1 Feb. 7, 2008

Related U.S. Application Data

(63) Continuation-in-part of application No. 11/370,750, filed on Mar. 8, 2006.

(51) Int. Cl.
*B62K 21/00* (2006.01)
(52) U.S. Cl. .................. 280/276; 280/279; 280/280
(58) Field of Classification Search .............. 280/276, 280/279, 280
See application file for complete search history.

(56) References Cited

U.S. PATENT DOCUMENTS

| | | | |
|---|---|---|---|
| 2,010,173 A | | 8/1935 | Anderson |
| 4,189,167 A | * | 2/1980 | Dubois ................ 280/279 |
| 4,662,645 A | * | 5/1987 | McMurtrey ............ 280/279 |
| 4,887,828 A | * | 12/1989 | Chonan ................ 280/280 |
| 5,405,202 A | * | 4/1995 | Chi .................... 384/545 |
| 5,860,666 A | | 1/1999 | Akamatsu |
| 5,865,069 A | * | 2/1999 | Edwards ............... 74/551.1 |
| 5,964,474 A | * | 10/1999 | Chen .................. 280/279 |
| 6,231,063 B1 | * | 5/2001 | Chi .................... 280/279 |
| 6,254,115 B1 | * | 7/2001 | Lin .................... 280/279 |
| 6,651,525 B2 | * | 11/2003 | Jiang .................. 74/551.1 |
| 6,729,634 B2 | * | 5/2004 | Tange .................. 280/279 |
| 6,883,818 B1 | * | 4/2005 | Chiang ................. 280/279 |
| 2005/0012299 A1 | * | 1/2005 | Schuman et al. ......... 280/288.3 |

* cited by examiner

*Primary Examiner*—Paul N Dickson
*Assistant Examiner*—Michael R Stabley
(74) *Attorney, Agent, or Firm*—Michael Best & Friedrich LLP

(57) ABSTRACT

A bicycle fork and frame assembly comprising a frame having a head tube including an outer dimension, a fork including a fork crown and a steerer tube positioned in the head tube, an upper bearing, and a lower bearing having a diameter. The upper and lower bearings are configured to rotatably support the fork within the head tube. The head tube includes a first end proximal to the fork crown and a second end distal to the fork crown. A ratio is defined by a distance from the first end of the head tube to the lower bearing divided by the diameter of the lower bearing, and the ratio is at least about 0.20, preferably at least about 0.25 and more preferably at least about 0.30. The assembly can further include a transition coupling the fork crown to the steerer tube and defining a transition point between the transition and the steerer tube. The transition has an outer dimension that increases from the steerer tube toward the fork crown, and the lower bearing is located adjacent to the transition point. The steerer tube can include a lower section coupled to an upper part of the transition at the transition point and an upper section coupled to the lower section. Preferably, the lower section has an outer dimension that tapers smaller moving away from the transition (e.g., frustoconical), and the upper section has a substantially constant cross section (e.g., cylindrical). The fork crown defines an arch way that is a distance from the lower bearing. In this aspect, a ratio is defined as the distance divided by the diameter of the lower bearing, and the ratio is at least about 0.7, preferably at least about 0.77, and more preferably at least about 0.83.

17 Claims, 10 Drawing Sheets

US 7,537,231 B2

BICYCLE FORK ASSEMBLY

RELATED APPLICATIONS

This patent application is a continuation-in-part of and claims priority to U.S. patent application Ser. No. 11/370,750, filed Mar. 8, 2006, the entire contents of which are hereby incorporated by reference.

BACKGROUND

The present invention relates to a fork assembly for a bicycle. More particularly, the invention relates to a fork and a lower bearing assembly configured for use in the fork assembly.

Most bicycles include a front fork that is rotatable to turn a front wheel. The fork typically includes two fork blades, and the front wheel is rotatably supported between the two fork blades. The fork blades are coupled at one end to form a crown, and a steerer tube typically extends from the crown. The steerer tube is rotatably supported within a head tube by at least two bearings, an upper bearing and a lower bearing. The head tube is coupled to and comprises a portion of a frame of the bicycle, and the bearings allow the fork to rotate relative to the head tube and frame. Generally, a handle bar is attached to the steerer tube to allow a rider to rotate the fork and steer the bicycle.

SUMMARY

The present invention provides a bicycle fork and frame assembly comprising a frame having a head tube including an outer dimension, a fork including a fork crown and a steerer tube positioned in the head tube, an upper bearing, and a lower bearing having a diameter. The upper and lower bearings are configured to rotatably support the fork within the head tube. The head tube includes a first end proximal to the fork crown and a second end distal to the fork crown. A ratio is defined by a distance from the first end of the head tube to the lower bearing divided by the diameter of the lower bearing, and the ratio is at least about 0.20, preferably at least about 0.25 and more preferably at least about 0.30.

In one embodiment, the assembly further comprises a transition coupling the fork crown to the steerer tube and defining a transition point been the transition and the steerer tube. The transition has an outer dimension that increases from the steerer tube toward the fork crown, and the lower bearing is located adjacent to the transition point.

In another embodiment, the steerer tube includes a lower section coupled to an upper part of the transition at the transition point and a upper section coupled to the lower section. Preferably, the lower section has an outer dimension that tapers smaller moving away from the transition (e.g., frusto-conical), and the upper section has a substantially constant cross section (e.g., cylindrical).

In yet another embodiment, the fork crown defines an arch way that is a distance from the lower bearing. In this aspect, a ratio is defined as the distance divided by the diameter of the lower bearing, and the ratio is at least about 0.7, preferably at least about 0.77, and more preferably at least about 0.83.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description an should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
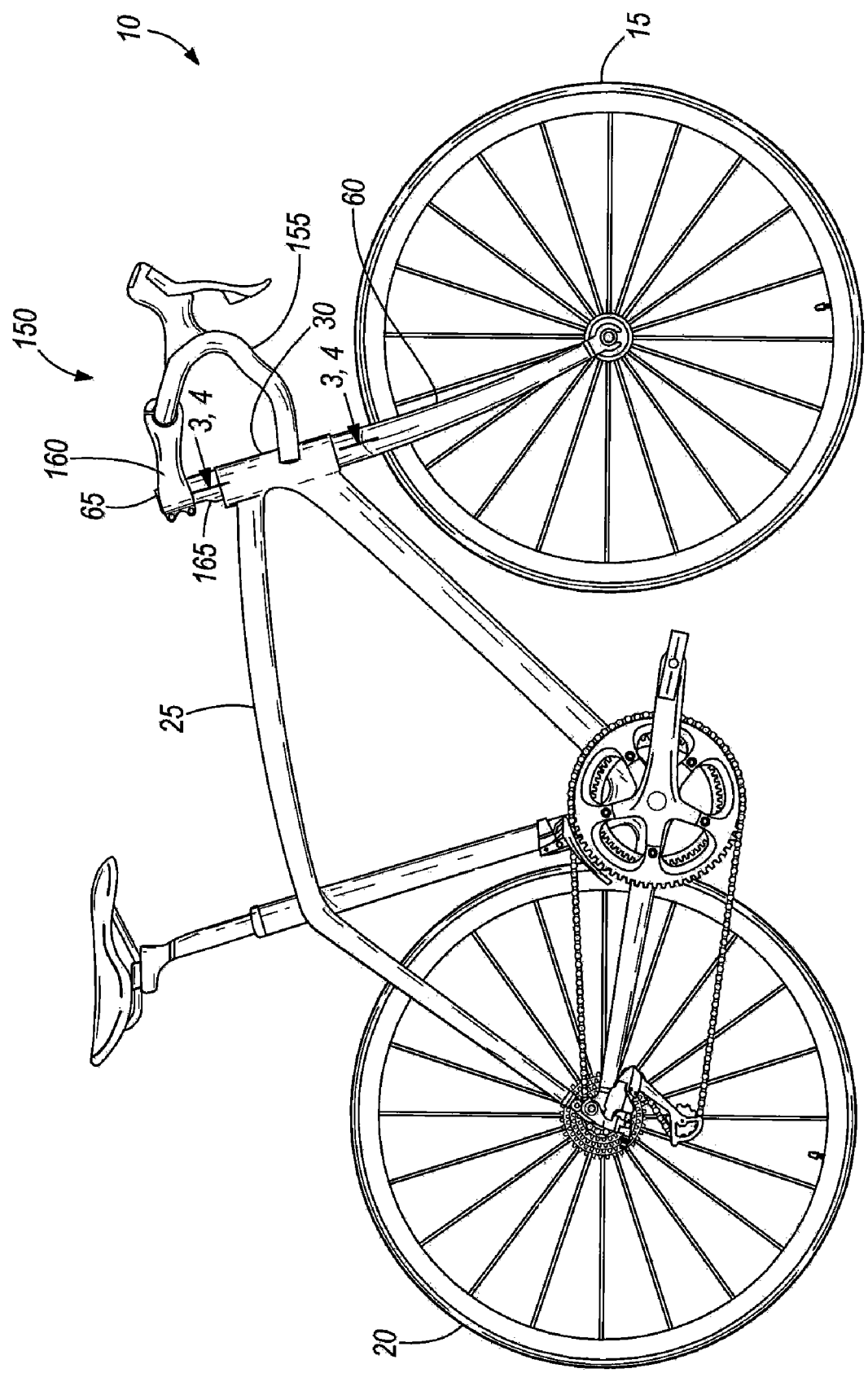
FIG. 1 is a side view of a bicycle including a fork assembly embodying the present invention.

FIG. 1 illustrates a bicycle 10 that includes a front wheel 15, a rear wheel 20, and a frame 25. The frame 25 can be made from any suitable material, such as steel, aluminum, carbon/epoxy composite, KEVLAR composite, fiberglass composite, or other composites and the like.

Figure 2:
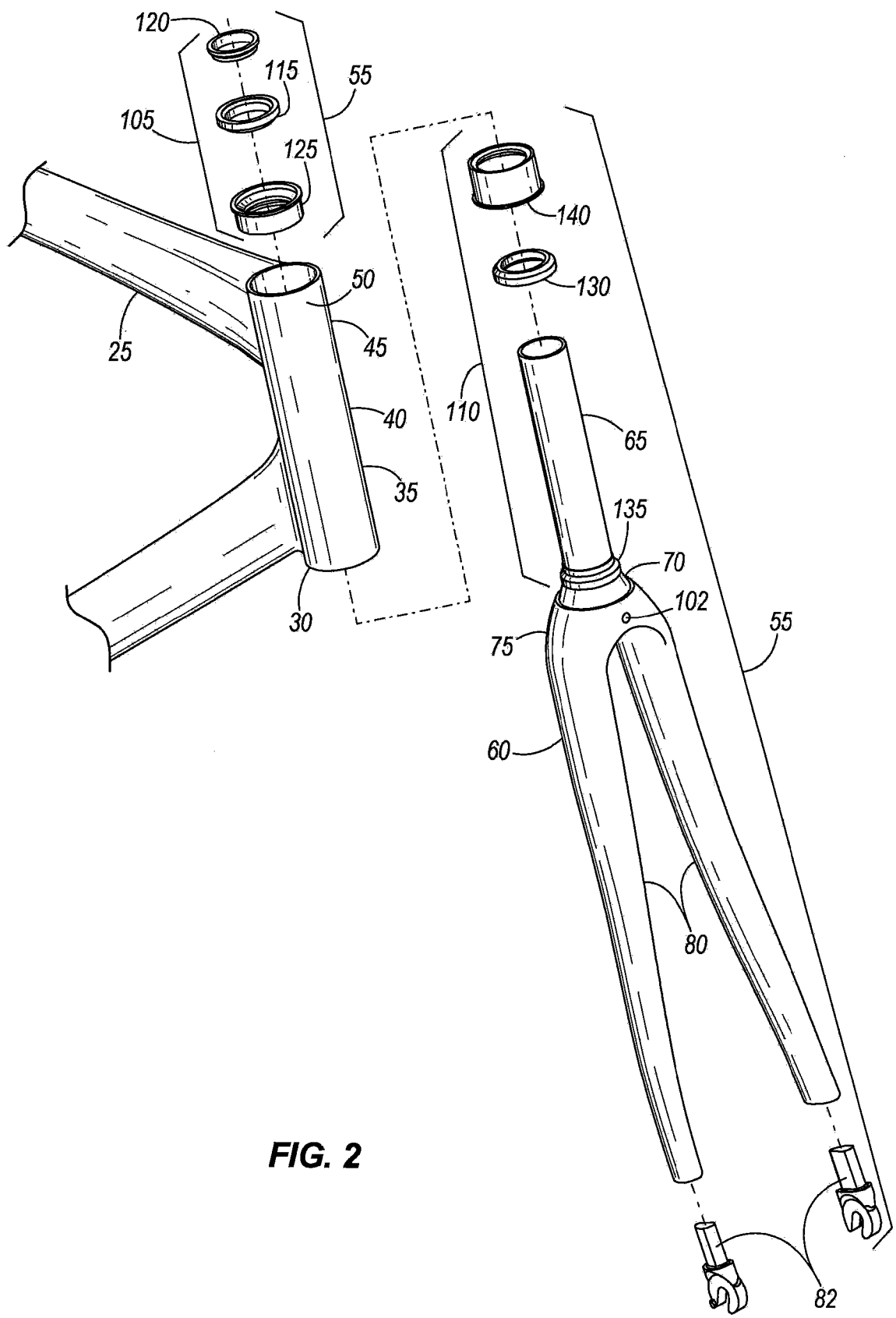
FIG. 2 is an exploded view of the fork assembly of FIG. 1 and a portion of the frame of the bicycle of FIG. 1.
Figure 4:
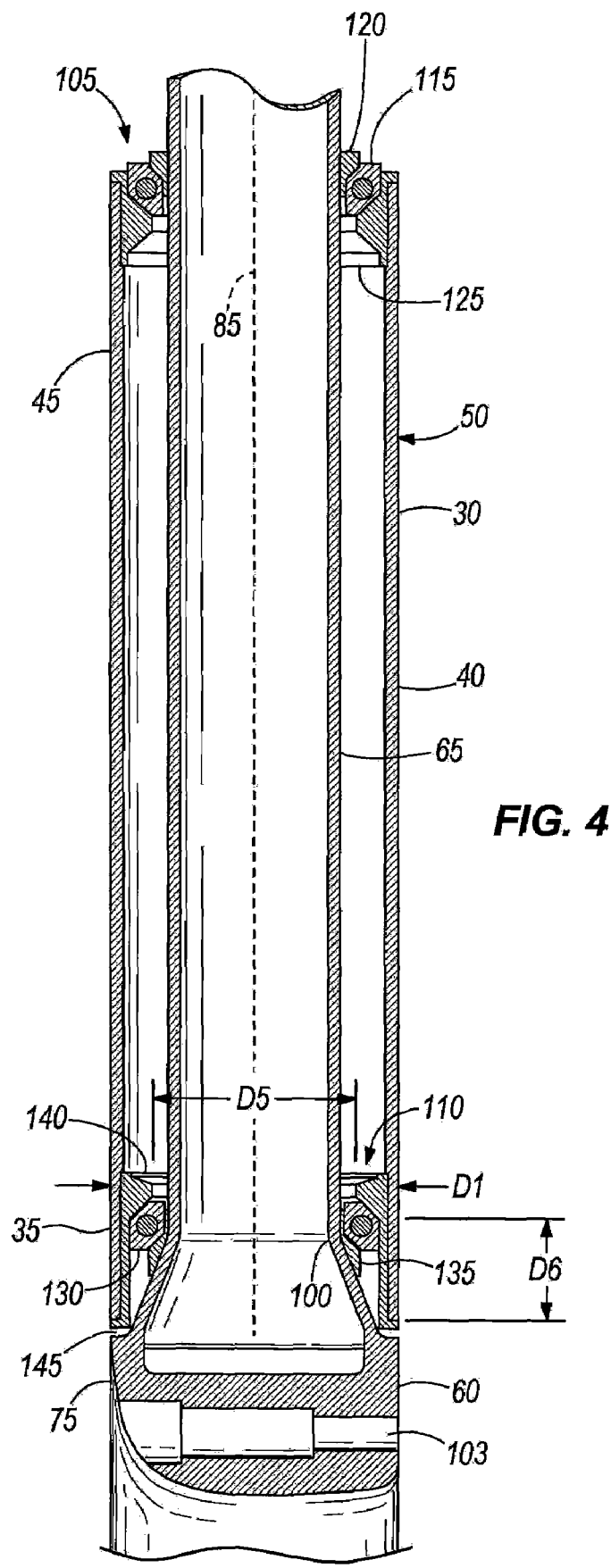
FIG. 4 is a cross-section of a portion of the bicycle taken along line 4-4 in FIG. 1.

Referring to FIGS. 2 and 4, the frame 25 includes a head tube 30 having an outer dimension D1 (47 mm in the illustrated embodiment). While the illustrated head tube 30 is cylindrical with a generally constant outer dimension D1, in other constructions the head tube 30 can have an outer dimension D1 that varies. For example, the outer dimension D1 of the head tube 30 may decrease from a lower portion 35 toward a center portion 40, then increase from the center portion 40 toward an upper portion 45. In yet other constructions, the head tube 30 can take shapes other than a cylinder. For example, the head tube 30 can have an outer surface 50 with a plurality of sides, such as three, four, or more sides, or the head tube can be aerodynamically shaped. For purposes of this patent application, the outer dimension D1 of the head tube 30 should be measured laterally across the lower portion 35 of the head tube 30.

A fork assembly 55 is received and supported by the head tube 30. The fork assembly 55 includes a fork 60 having a steerer tube 65, a transition 70, a fork crown 75, two fork blades 80, and two fork dropouts 82. The illustrated steerer tube 65, transition 70, fork crown 75 and fork blades 80 are integrally formed as a single piece made from a carbon/epoxy composite. Of course other materials such as plastics, fiberglass composite, KEVLAR composite, or other composites, and the like can be used to integrally form the steerer tube 65, transition 70, fork crown 75 and fork blades 80. In other constructions, the steerer tube 65, transition 70, fork crown 75 and fork blades 80 may not be integrally formed as a single piece. For example, in one construction the fork blades 80 can be made separate from the fork crown 75, and then the fork blades 80 can be bonded to the crown using epoxy or any suitable adhesive. In yet another construction, the steerer tube 65 can be formed separate from the transition 70 and then coupled to the transition using an adhesive, such as epoxy. Furthermore, the steerer tube 65, transition 70, fork crown 75, and fork blades 80 may not all be formed from composite material. In one such construction the transition 70 can be made from aluminum and the steerer tube 65 and fork crown 75 can be made from a composite material. Other various combinations of materials can also be utilized.

Figure 3:
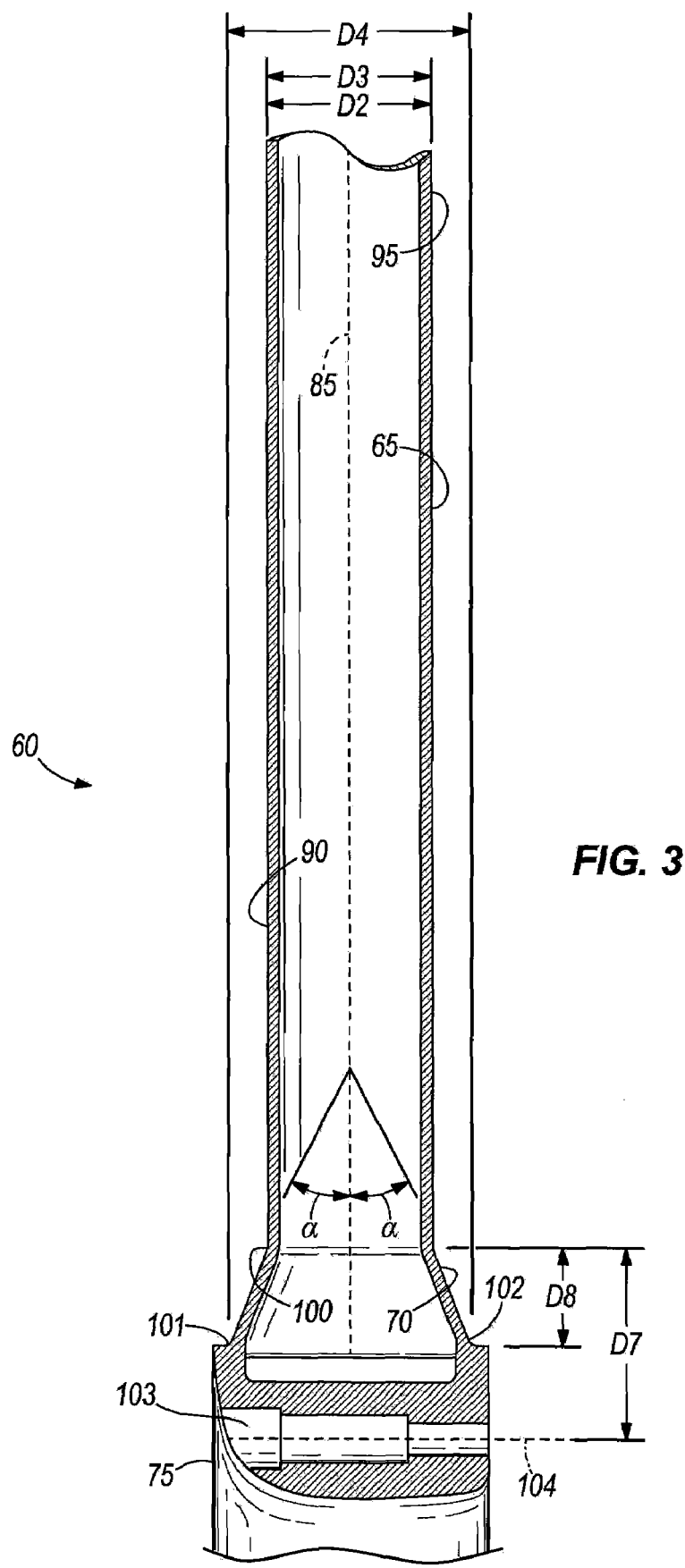
FIG. 3 is a cross-section of a portion of the fork assembly taken along line 3-3 in FIG. 1.

Referring to FIG. 3, the steerer tube 65 is generally cylindrical and defines a central axis 85. While the illustrated steerer tube 65 is cylindrical in shape, in other constructions the steerer tube 65 can be frustoconical, such that an outer dimension D2 (29 mm in the illustrated embodiment) of the steerer tube 65 either increase or decreases from a lower portion 90 toward an upper portion 95. Furthermore, while the illustrated steerer tube 65 is hollow with a uniform wall thickness, in other constructions the wall thickness may not be uniform. For example, in other constructions the wall thickness can decrease from the lower portion 90 toward the upper portion 95.

Referring to FIGS. 2 and 3, the transition 70 extends from the fork crown 75 to couple the fork crown 75 to the steerer tube 65. An upper transition point 100 is defined by the location where the transition 70 couples to the steerer tube 65, and lower transition point 101 is defined by the location where the transition 70 couples to the fork crown 75. The transition 70 has a first outer dimension D3 (29 mm in the illustrated embodiment) at the upper transition point 100 and a second outer dimension D4 (40 mm in the illustrated embodiment) where the transition 70 couples to the fork crown 75 at the lower transition point 101. While the illustrated fork 60 includes a radius portion 102 located between lower transition point 101 and the fork crown 75, in other constructions the fork 60 may omit the radius portion 102. Therefore, for purposes of this patent application, the lower transition point 101 will be defined as the point where the transition 70 couples to the radius portion 102, or in embodiments that omit the radius portion 102, the lower transition point 101 will defined as the point where the transition 70 couples to the crown 75.

In the illustrated embodiment, the first outer dimension D3 of the transition 70 is equal the outer dimension D2 of the steerer tube 65 at the upper transition point 100, and the first outer dimension D3 of the transition 70 increases from the upper transition point 100 toward the fork crown 75. A ratio is defined by the second outer dimension D4 of the transition 70 divided by the first outer dimension D3 of the transition 70. In the illustrated construction, the ratio is about 1.4, and in other constructions the ratio is greater than about 1.2.

The frustoconical outer surface of the transition 70 defines an angle α between the outer surface of the transition 70 and the central axis 85 of the steerer tube 65. The illustrated angle α is about 20 degrees, and in other constructions, the angle α is greater than about 10 degrees. While the illustrated transition 70 is frustoconical in shape, in other constructions, the transition can have a plurality of sides. For example, in other constructions, the transition can have three, four, or more sides.

Referring to FIGS. 2 and 4, the fork assembly 55 also includes an upper bearing assembly 105 and a lower bearing assembly 110. The upper bearing assembly 105 includes an upper bearing 115, a compression ring 120, an upper cup 125. The upper cup 125 is rotationally fixed with respect to the head tube 30 and supports the upper bearing 115 within the head tube 30. The compression ring 120 is located between the steerer tube 65 and the upper bearing 115 and is generally fixed with respect to the steerer tube 65. The upper bearing 115 is located between the upper cup 125 and compression ring 120 and provides for relative rotation between steerer tube 65 and the head tube 30. The upper bearing 115 can be any suitable bearing, such as a loose ball bearing, a retainer ball bearing, a cartridge type bearing, and the like.

Referring to FIG. 3, the fork crown 75 includes a brake mount in the form of an opening 103 extending through the fork crown 75 and defining a brake-mounting axis 104. The function and operation of the opening 103 is well known to one of ordinary skill in the art. It should be understood that other types of brake mounts could be used with the present invention.

The lower bearing assembly 110 includes a lower bearing 130, a crown race 135, and a lower cup 140. The crown race 135 can be made from any suitable material, such as aluminum, steel, plastic, composite, etc. The crown race 135 is coupled to the fork 60 circumferentially around the upper transition point 100 such that the crown race 135 is fixed with respect to the fork 60. In the illustrated construction, the crown race 135 is co-molded to the fork 60, while in other constructions the crown race 135 can be bonded to the fork 60.

The lower cup 140 is coupled to the head tube 30, such that the lower cup 140 is rotationally fixed with respect to the head tube 30. The lower cup 140 can be made from any suitable material, such as aluminum, steel, plastic, composite, etc.

The lower bearing 130 is located between the crown race 135 and the lower cup 140, such that the lower bearing 130 is circumferentially around the upper transition point 100. The lower bearing 130 can be any suitable bearing, such as a loose ball bearing, a retainer ball bearing, a cartridge type bearing, and the like. The illustrated lower bearing 130 has a diameter D5 of approximately 36 mm. In other constructions, the lower bearing 130 can have any suitable diameter D5.

The illustrated lower bearing 130 is located at a distance D6 from an end of the head tube 30. In the illustrated construction, the distance D6 is approximately 15 mm and in other constructions is at least about 8.5 mm. In yet other constructions, the lower bearing 130 can be located either above or below the upper transition point 100.

The upper transition point 100 and the lower bearing 130 are located at a distance D7 from the brake-mounting axis 104. In the illustrated embodiment, this distance D7 is 33 mm for the upper transition point 100 and 35 mm for the lower bearing 130. In addition, the upper transition point 100 and the lower bearing 130 are located at a distance D8 from the lower transition point 101 (essentially, the length of the transition 70). In the illustrated embodiment, this distance D8 is 16 mm for the upper transition point 100 and 18 mm for the lower bearing 130.

A first ratio is defined by the distance D6 from the end of the head tube 30 to the lower bearing 130 divided by the outer dimension D1 of the head tube 30. In the illustrated embodiment, the first ratio is about 0.33. In other embodiments, the first ratio is at least about 0.28 and in yet other embodiments the ratio is at least about 0.23.

A second ratio is defined by the distance D6 from the end of the head 30 to the lower bearing 130 divided by the diameter D5 of the lower bearing 130. In the illustrated embodiment, the second ratio is about 0.42. In other embodiments, the second ratio is at least about 0.30 and it yet other embodiments the ratio is at least about 0.25.

A third ratio is defined by the distance D7 from the brake-mounting axis 104 to the lower bearing 130 divided by the diameter D5 of the lower bearing 130. In the illustrated embodiment, the third ratio is about 0.97. In other embodiments, the third ratio is at least about 0.8 and preferably at least about 0.7.

A fourth ratio defined by the distance D7 from the brake-mounting axis 104 to the lower bearing 130 or the upper transition point 100 divided by the dimension D4 of the transition 70 at the lower transition point 101. In the illustrated embodiment, the fourth ratio is about 0.81. In other embodiments, the fourth ratio is at least about 0.63 and preferably at least about 0.5.

A fifth ratio is defined by the distance D7 from the brake-mounting axis 104 to the lower bearing 130 or the upper transition point 100 divided by the outer dimension D1 of the head tube 30. In the illustrated embodiment, the fifth ratio is about 0.70. In other embodiments, the fifth ratio is at least about 0.60 and preferably at least about 0.50.

The upper and lower bearing assemblies 105, 110 allow the steerer tube 65 to rotate with respect to the head tube 30 while maintaining the steerer tube 65 in a generally fixed location with respect to the head tube 30 in both axial and radial directions. The upper and lower bearing assemblies 105, 110 also position the fork 60 within the head tube 30 such that a gap 145 is formed between the lower cup 140 and the crown 75.

Referring to FIG. 1 the steerer tube 65 extends through and above the head tube 30 to provide an attachment point for a steering assembly 150. The steering assembly 150 includes a handlebar 155, a stem 160, and a sleeve 165. The stem 160 is coupled to the steerer tube 65 and retains the sleeve 165 that surrounds the steerer tube 65, between the stem 160 and the head tube 30. The sleeve 165 includes a cap (not shown) that covers the upper bearing assembly 105 to substantially prevent dirt, debris, liquid and the like from contacting the upper bearing 115. While the illustrated upper bearing assembly 105, stem 160, and sleeve 165 are in a configuration similar to a conventional threadless headset, it should be understood that in other constructions a threaded headset can be utilized. In such a construction, an additional threaded nut is provided and the threaded nut is coupled to the steerer tube 65, which is also threaded, thereby coupling the stem 160 and sleeve 165 to the steerer tube 65.

Figure 5:
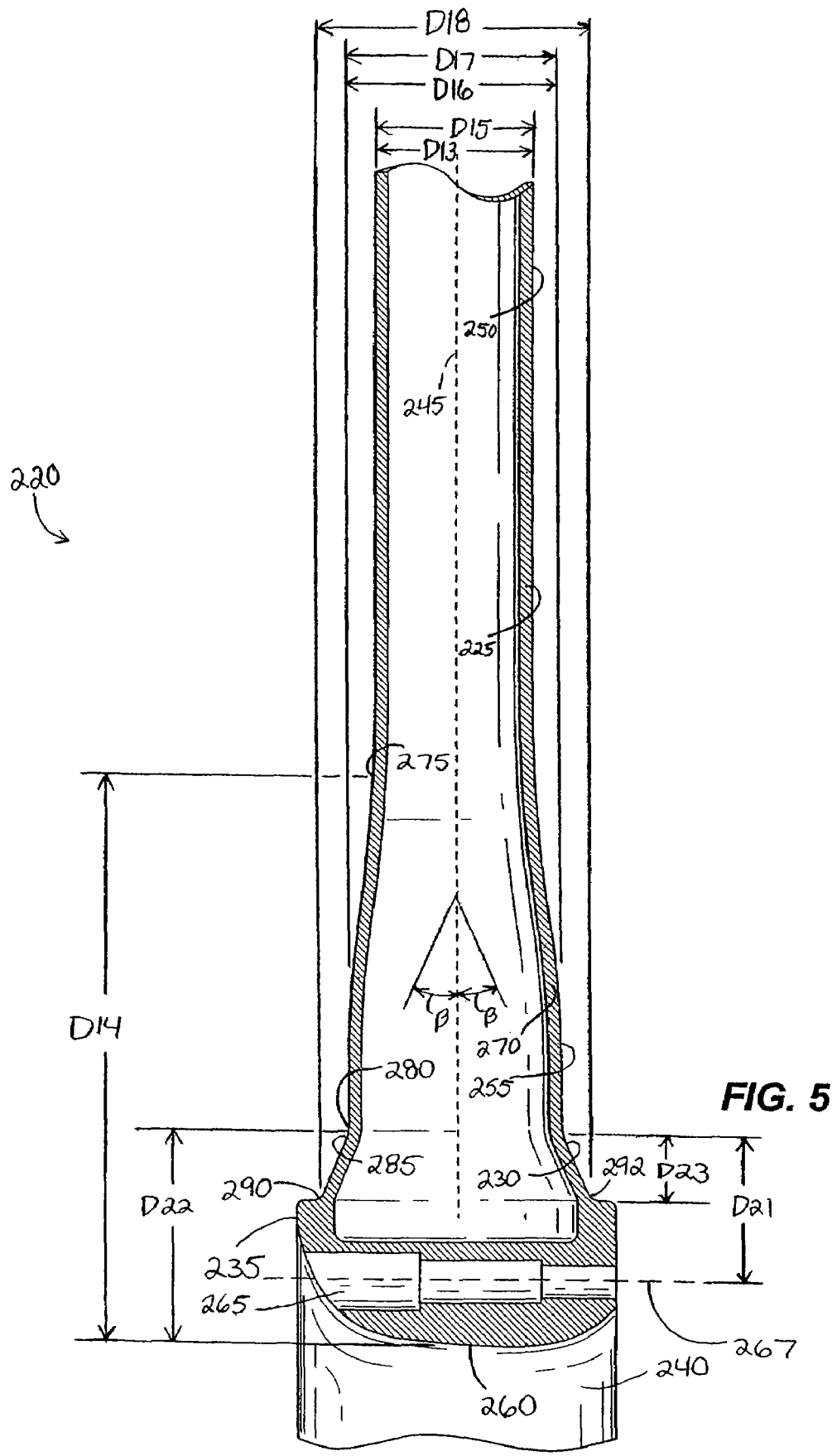
FIG. 5 is a cross-section of a portion of another fork assembly.
Figure 6:
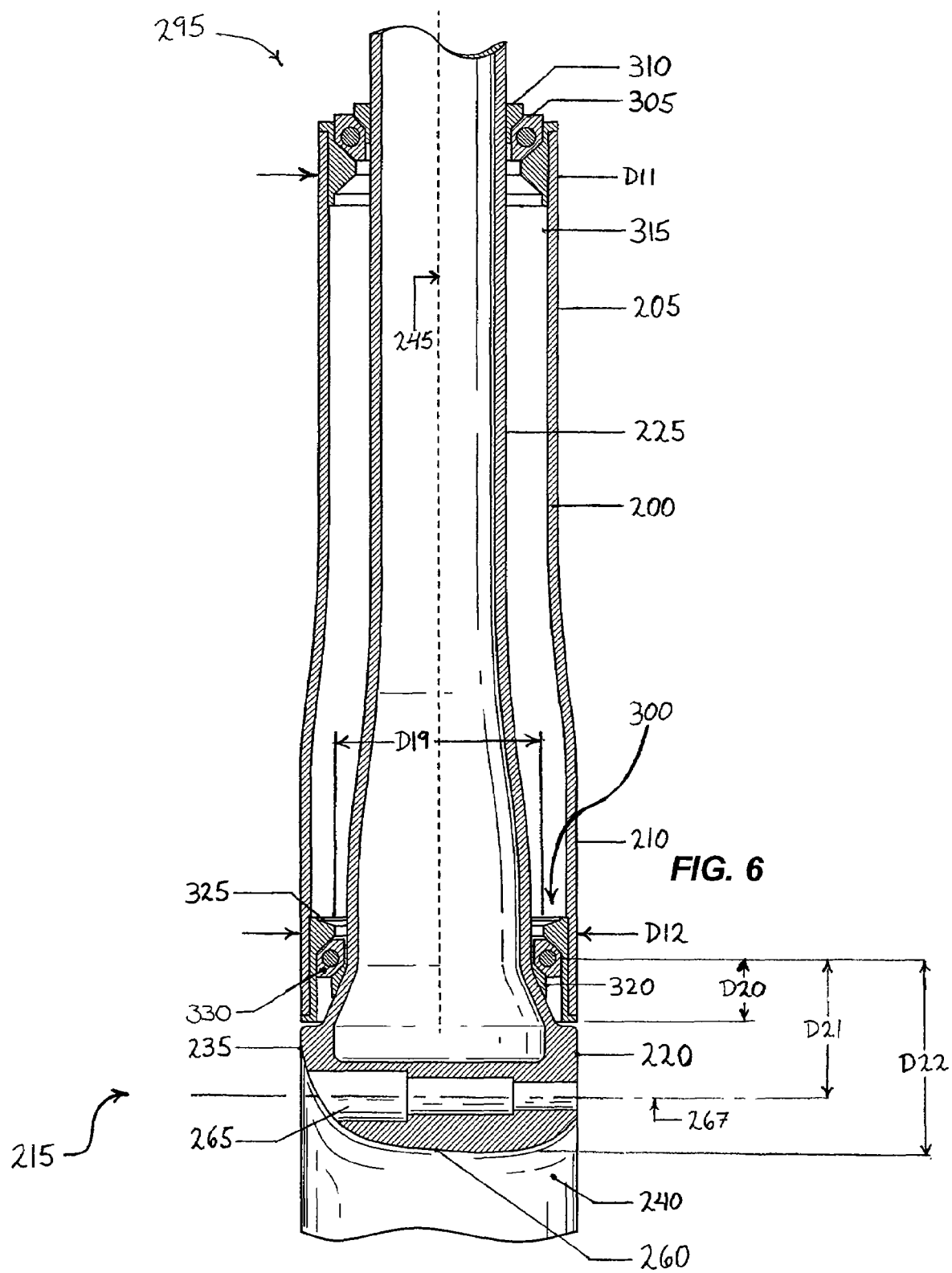
FIG. 6 is a cross-section of a portion of the fork assembly of FIG. 5 mounted in a head tube by an upper bearing assembly and a lower bearing assembly.

FIGS. 5 and 6 illustrate another embodiment of a fork assembly 215. FIG. 6 shows the fork assembly 215 mounted in a head tube 200 that is tapered or smoothly transitioned from an upper portion 205 to a lower portion 210. The upper portion 205 has an outer dimension D11 (48 mm in the illustrated embodiment), and the lower portion 210 has an outer dimension D12 (58 mm in the illustrated embodiment). In other constructions, the head tube 200 can be cylindrical with a generally constant outer dimension D11 or D12. In yet other constructions, the head tube 200 can take shapes other than a cylinder (e.g., an outer surface with a plurality of sides, such as three, four, or more sides), or the head tube 200 can be aerodynamically shaped.

FIGS. 5 and 6 show that the fork assembly 215 includes a steerer tube 225, a transition 230, a fork crown 235, and two fork blades 240 (one shown). The fork assembly 215 also includes two fork dropouts (not shown) that are similar to the fork drop outs 82 discussed above with regard to FIG. 2. The illustrated steerer tube 225, the transition 230, the fork crown 235 and the fork blades 240 are integrally formed as a single piece made from a carbon/epoxy composite. Of course other materials such as metals, polymers, fiberglass composite, KEVLAR composite, or other composites, and the like can be used to integrally form the steerer tube 225, the transition 230, the fork crown 235 and the fork blades 240.

As discussed above with regard to FIGS. 1-4, the steerer tube 225, the transition 230, the fork crown 235, and the fork blades 240 may not be integrally formed as a single piece. For example, the fork blades 240 and/or the steerer tube 225 can be formed separate from other components (e.g., the fork crown 235, the transition 230, etc.), and then coupled together using an adhesive (e.g., epoxy). Furthermore, one or more of the steerer tube 225, the transition 230, the fork crown 235, and the fork blades 240 can be made from aluminum, while the remaining components not made from aluminum can be formed from other materials, such as a composite material. Other various combinations of materials can also be utilized.

FIG. 5 shows the fork assembly 215 removed from the head tube 200. The steerer tube 225 defines a central axis 245, and is generally cylindrical in shape. The steerer tube 225 smoothly transitions or tapers from an upper portion 250 to a lower portion 255 without sharp corners in the steerer tube 225. In other constructions, the steerer tube 225 can be substantially cylindrical in shape. Furthermore, while the illustrated steerer tube 225 is hollow with a uniform wall thickness, in other constructions the wall thickness may vary. For example, in other constructions the wall thickness of the steerer tube 225 can increase or decrease from the upper portion 250 toward the lower portion 255.

The fork crown 235 is in communication with the lower portion 255 of the steerer tube 225, and includes an archway 260 disposed between the fork blades 240 to accommodate the front wheel 15. The fork crown 235 also includes a brake mount in the form of an opening 265 that extends through the fork crown 235 and that defines a brake-mounting axis 267.

The upper portion 250 includes an outer dimension D13 (29 mm in the illustrated embodiment). FIGS. 5 and 6 show that the lower portion 255 includes a taper or elongated curved portion 270 extending from the upper portion 250 of the steerer tube 225 toward the transition 230. In the illustrated construction, the taper 270 is curved from the upper portion 250 to the lower portion 255. In other constructions, the taper 270 can be substantially straight between the upper portion 250 and the lower portion 255.

The illustrated taper 270 includes an upper transition point 275 defined by the location where the taper 270 couples to the upper portion 250 of the steerer tube 225, and a lower transition point 280 defined by the location where the taper 270 couples to the transition 230. The upper transition point 275 is located at a distance D14 from the archway 260 (116 mm in the illustrated embodiment). In other constructions, the distance D14 can be longer or shorter than 116 mm. The taper 270 also has a first outer dimension D15 (29 mm in the illustrated embodiment) at the upper transition point 275, and a second outer dimension D16 (39 mm) at the lower transition point 280. In the illustrated embodiment, the first outer dimension D15 of the taper 270 is equal to the outer dimension D13 of the upper portion 250.

The transition 230 extends from the fork crown 235 to couple the fork crown 235 to the steerer tube 225, and includes an upper transition point 285 and a lower transition point 290. The upper transition point 285 is defined by the location where the transition 230 couples to the taper 270, which is the same location as the lower transition point 280. The lower transition point 290 is defined by the location where the transition 230 couples to the fork crown 235. The transition 230 has a first outer dimension D17 (39 mm in the illustrated embodiment) at the upper transition point 285 and a second outer dimension D18 (50 mm) where the transition 230 couples to the fork crown 235 at the lower transition point 290. While the illustrated fork 220 includes a radius portion 292 located between lower transition point 290 and the fork crown 235, in other constructions the 220 may omit the radius portion 292. Therefore, for purposes of this patent application, the lower transition point 290 will be defined as the point where the transition 230 couples to the radius portion 292, or in embodiments that omit the radius portion 292, the lower transition point 290 will defined as the point where the transition 230 couples to the fork crown 235.

In the illustrated embodiment, the first outer dimension D17 of the transition 230 is equal the second outer dimension D16 of the taper 270 at the upper transition point 285. The outer dimension of the transition 230 increases from the upper transition point 285 toward the fork crown 235. A first ratio is defined by the second outer dimension D18 of the transition 230 divided by the first outer dimension D17 of the transition 230. In the illustrated construction, the ratio is about 1.3, and in other constructions the ratio is greater than about 1.1 or 1.2.

The transition 230 includes a frustoconical outer surface that defines an angle β between the outer surface of the transition 230 and the central axis 245 of the steerer tube 225. The illustrated angle β is about 25 degrees, and in other constructions, the angle β is greater than about 20 or 15 or 10 degrees. While the illustrated transition 230 is frustoconical in shape, in other constructions, the transition 230 can have a plurality of sides.

Referring to FIG. 6, the fork assembly 215 also includes an upper bearing assembly 295 and a lower bearing assembly 300. Generally, the upper bearing assembly 295 includes an upper bearing 305, a compression ring 310, and an upper cup 315, which are similar to the upper bearing 115, the compression ring 120, and the upper cup 125 of the upper bearing assembly 105 discussed above with regard to FIGS. 2 and 4. As such, the upper bearing assembly 295 will not be discussed in detail. Generally, the upper bearing 305, the compression ring 310, and the upper cup 315 are sized to accommodate the outer dimension D13 of the steerer tube 225 and an inner dimension of the head tube 200.

The lower bearing assembly 300 includes a crown race 320, a lower cup 325, and a lower bearing 330. The crown race 320 can be made from any suitable material, such as aluminum, steel, plastic, composite, etc. The crown race 320 is coupled to the fork 220 circumferentially around the upper transition point 285 such that the crown race 320 is fixed with respect to the fork 220. In the illustrated construction, the crown race 320 is co-molded to the fork 220, while in other constructions the crown race 320 can be bonded or press fit to the fork 220.

The lower cup 325 is coupled to the head tube 200 such that the lower cup 325 is fixed with respect to the head tube 200. The lower cup 325 can be made from any suitable material, such as aluminum, steel, plastic, composite, etc.

The lower bearing 330 is located between the crown race 320 and the lower cup 325, such that the lower bearing 330 is circumferentially around the upper transition point 285. The lower bearing 330 can be any suitable bearing, such as a loose ball bearing, a retainer ball bearing, a cartridge type bearing, and the like. The illustrated lower bearing 330 has a diameter D19 of approximately 46 mm. In other constructions, the lower bearing 330 can have any suitable diameter D19.

The illustrated lower bearing 330 is located at a distance D20 from an end of the head tube 200. In the illustrated construction, the distance D20 is approximately 14.5 mm and in other constructions is at least about 8.5 mm. In yet other constructions, the lower bearing 330 can be located either above or below the upper transition point 285 of the transition 230.

The upper transition point 285 of the transition 230 and the lower bearing 330 are located at a distance D21 from the brake-mounting axis 267. In the illustrated embodiment, this distance D21 is approximately 27 mm for the upper transition point 285 and 30.5 mm for the lower bearing 330. The upper transition point 285 and the lower bearing 330 are further located at a distance D22 from the archway 260. In the illustrated embodiment, this distance D22 is 40 mm for the upper transition point 285 and 43.5 mm for the lower bearing 330. In addition, the upper transition point 285 and the lower bearing 330 are located at a distance D23 from the lower transition point 290. In the illustrated embodiment, this distance D23 is 13 mm for the upper transition point 285 and 15 mm for the lower bearing 330.

A second ratio is defined by the distance D20 from the end of the head tube 200 to the lower bearing 330 divided by the outer dimension D12 of the head tube 200. In the illustrated embodiment, the second ratio is about 0.25. In other embodiments, the second ratio is at least about 0.20 and in yet other embodiments the ratio is at least about 0.15.

A third ratio is defined by the distance D20 from the end of the head to the lower bearing 330 divided by the diameter D19 of the lower bearing 330. In the illustrated embodiment, the third ratio is about 0.32. In other embodiments, the third ratio is at least about 0.27 and it yet other embodiments the third ratio is at least about 0.22.

A fourth ratio is defined by the distance D21 from the brake-mounting axis 267 to the lower bearing 330 divided by the diameter D19 of the lower bearing 330. In the illustrated embodiment, the fourth ratio is about 0.66. In other embodiments, the fourth ratio is at least about 0.62 and preferably at least about 0.58.

A fifth ratio is defined by the distance D21 from the brake-mounting axis 267 to the lower bearing 330 divided by the second outer dimension D18 of the transition 230 at the lower transition point 290. In the illustrated embodiment, the fifth ratio is about 0.61. In other embodiments, the fifth ratio is at least about 0.55 and preferably at least about 0.50.

A sixth ratio is defined by the distance D21 from the brake-mounting axis 267 to the lower bearing 330 divided by the outer dimension D12 of the head tube 200. In the illustrated embodiment, the sixth ratio is about 0.53. In other embodiments, the sixth ratio is at least about 0.48 and preferably at least about 0.43.

A seventh ratio is defined by the distance D22 from the archway 260 to the lower bearing 330 divided by the diameter D19 of the lower bearing 330. In the illustrated embodiment, the seventh ratio is about 0.95. In other embodiments, the seventh ratio is at least about 0.90 and preferably at least about 0.80.

An eighth ratio is defined by the distance D22 from the archway 260 to the lower bearing 330 divided by the second outer dimension D18 of the transition 230 at the lower transition point 290. In the illustrated embodiment, the eighth ratio is about 0.87. In other embodiments, the eighth ratio is at least about 0.81 and preferably at least about 0.75.

A ninth ratio is defined by the distance D22 from the archway 260 to the lower bearing 330 divided by the outer dimension D12 of the head tube 200. In the illustrated embodiment, the ninth ratio is about 0.75. In other embodiments, the ninth ratio is at least about 0.69 and preferably at least about 0.63.

Attachment of the fork assembly 215 to the frame 25 and the head tube 200 is similar to the attachment of the fork assembly 55 to the frame 25 and the head tube 30 described with regard to FIGS. 1-4. Operation of the fork assembly 215 within the head tube 200 is also similar to operation of the fork assembly 55 described above. As such, attachment and operation of the fork assembly 215 will not be discussed in detail.

Generally, the tapered head tube 200 and the taper 270 of the steerer tube 225 provide additional rigidity and strength to the frame and the fork assembly 215, respectively. Generally, the larger lower bearing assembly 295 relative to the upper bearing assembly 295 allows the head tube 200 and the steerer tube 225 to be enlarged at its base to allow a relatively larger fork crown 235 and fork blades 240, which in turn contributes to the stiffness of the bicycle. The relatively small upper portions 205, 250 of the head tube 200 and the steerer tube 225, and the upper bearing assembly 295 provide for operation of the bicycle 10 while maintaining a relatively low overall weight of the bicycle 10.

FIGS. 7-10 illustrate another embodiment for a bicycle 400 (e.g., mountain bicycle) that includes a frame 405. The frame 405 can be made from any suitable material, such as steel, aluminum, carbon/epoxy composite, KEVLAR composite, fiberglass composite, or other composites and the like.

Figure 7:
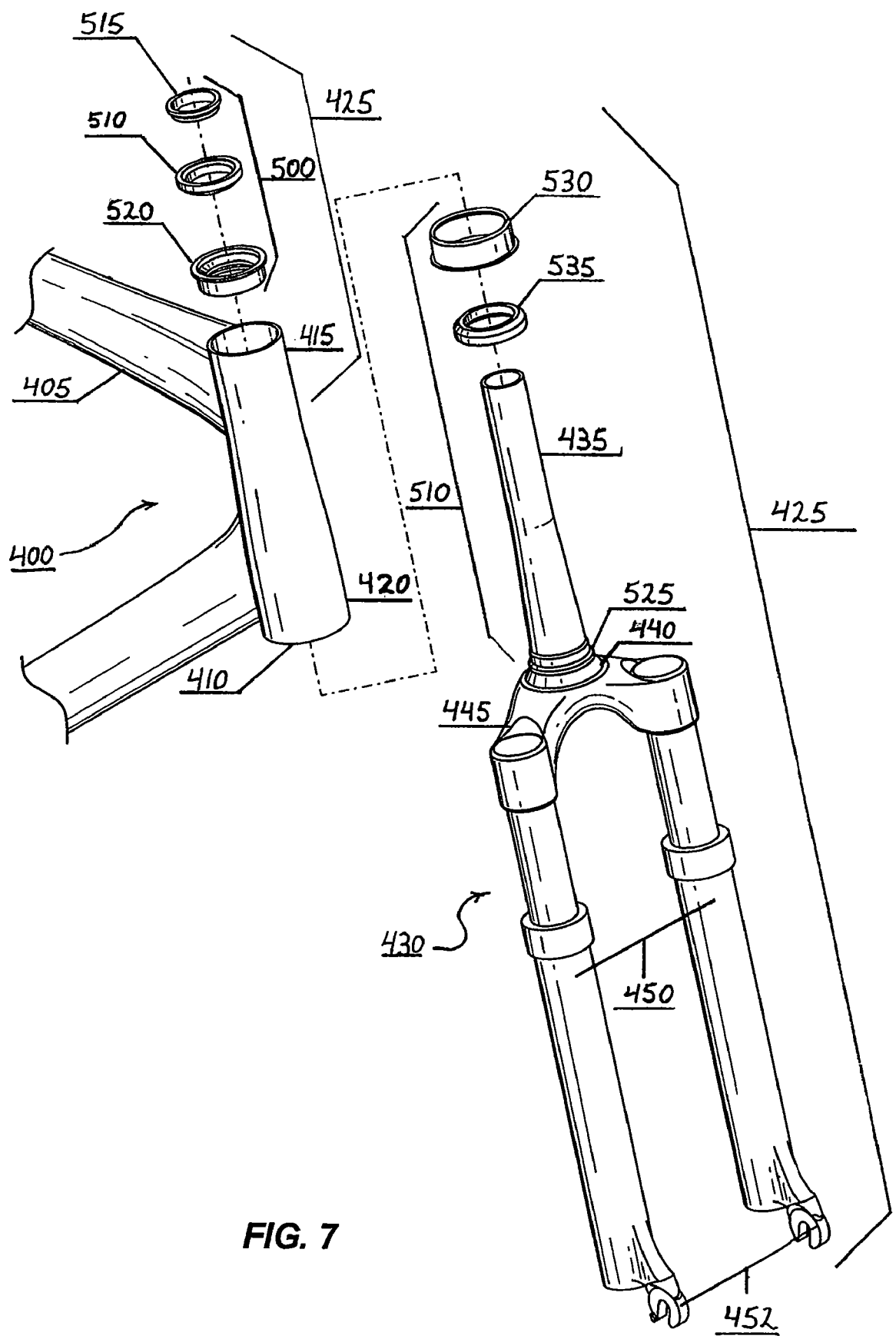
FIG. 7 is an exploded perspective view of another fork assembly and a portion of another frame of a bicycle.
Figure 10:
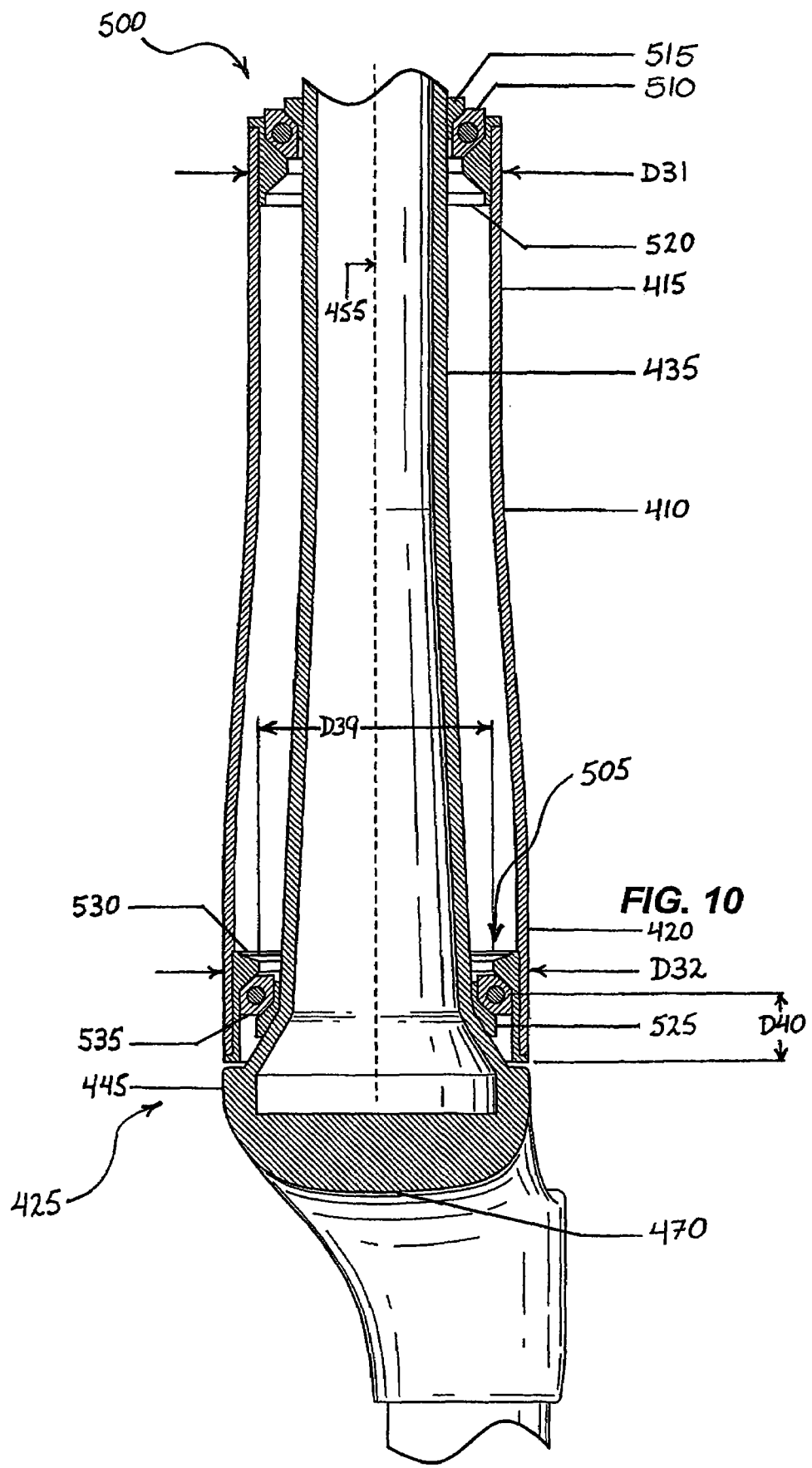
FIG. 10 is a cross-section of a portion of the fork assembly of FIG. 7 mounted in a head tube by an upper bearing assembly and a lower bearing assembly.

FIGS. 7 and 10 show that the frame 405 includes a head tube 410 that is tapered or smoothly transitioned from an upper portion 415 to a lower portion 420. The upper portion 415 has an outer dimension D31 (48 mm in the illustrated embodiment), and the lower portion 420 has an outer dimension D32 (58 mm in the illustrated embodiment). In other constructions, the head tube 410 can be cylindrical with a generally constant outer dimension D31 or D32. In yet other constructions, the head tube 410 can take shapes other than a cylinder (e.g., an outer surface with a plurality of sides, such as three, four, or more sides), or the head tube 410 can be aerodynamically shaped.

Figure 8:
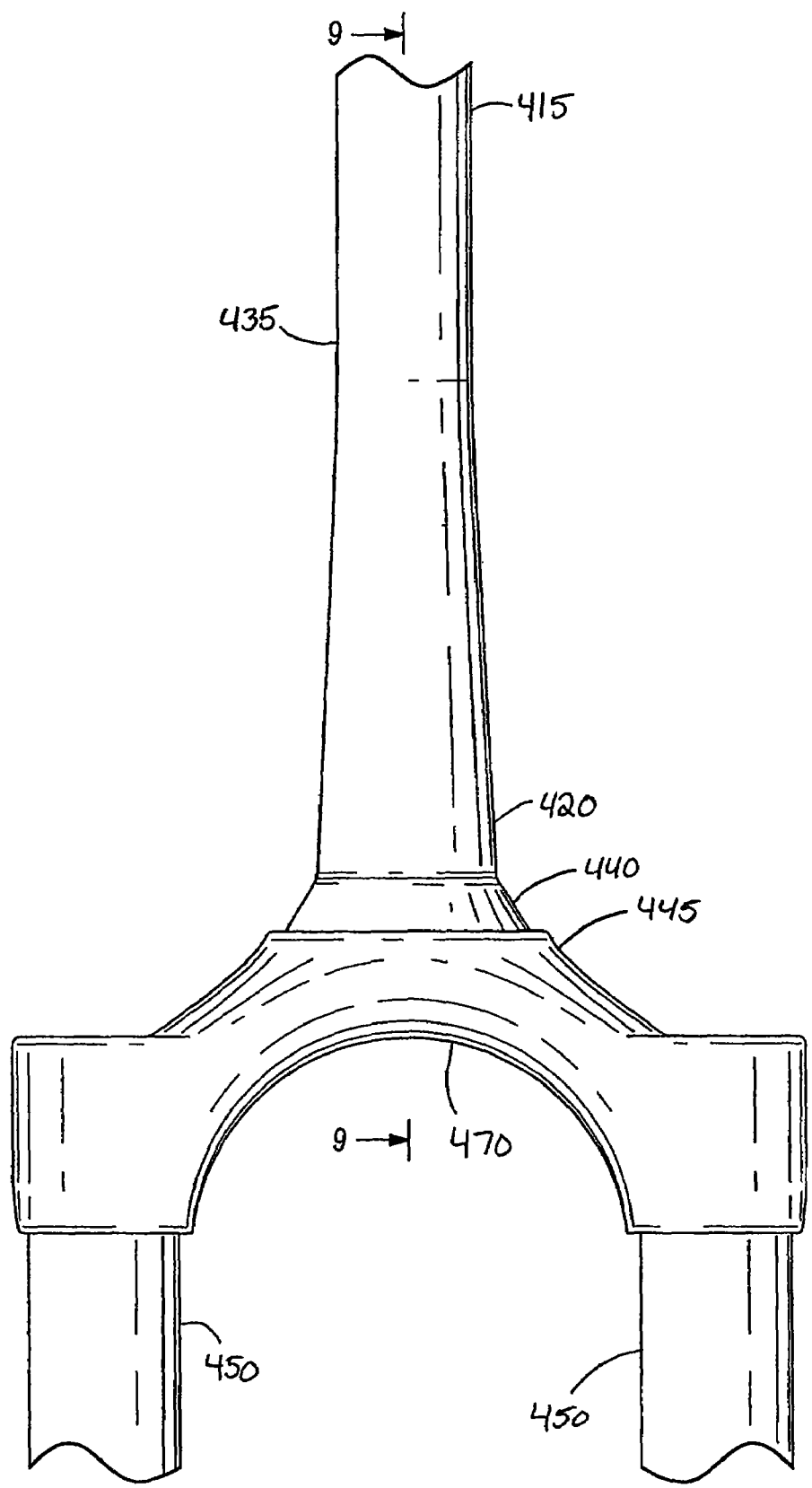
FIG. 8 is a front view of a portion of the fork assembly of FIG. 7.
Figure 9:
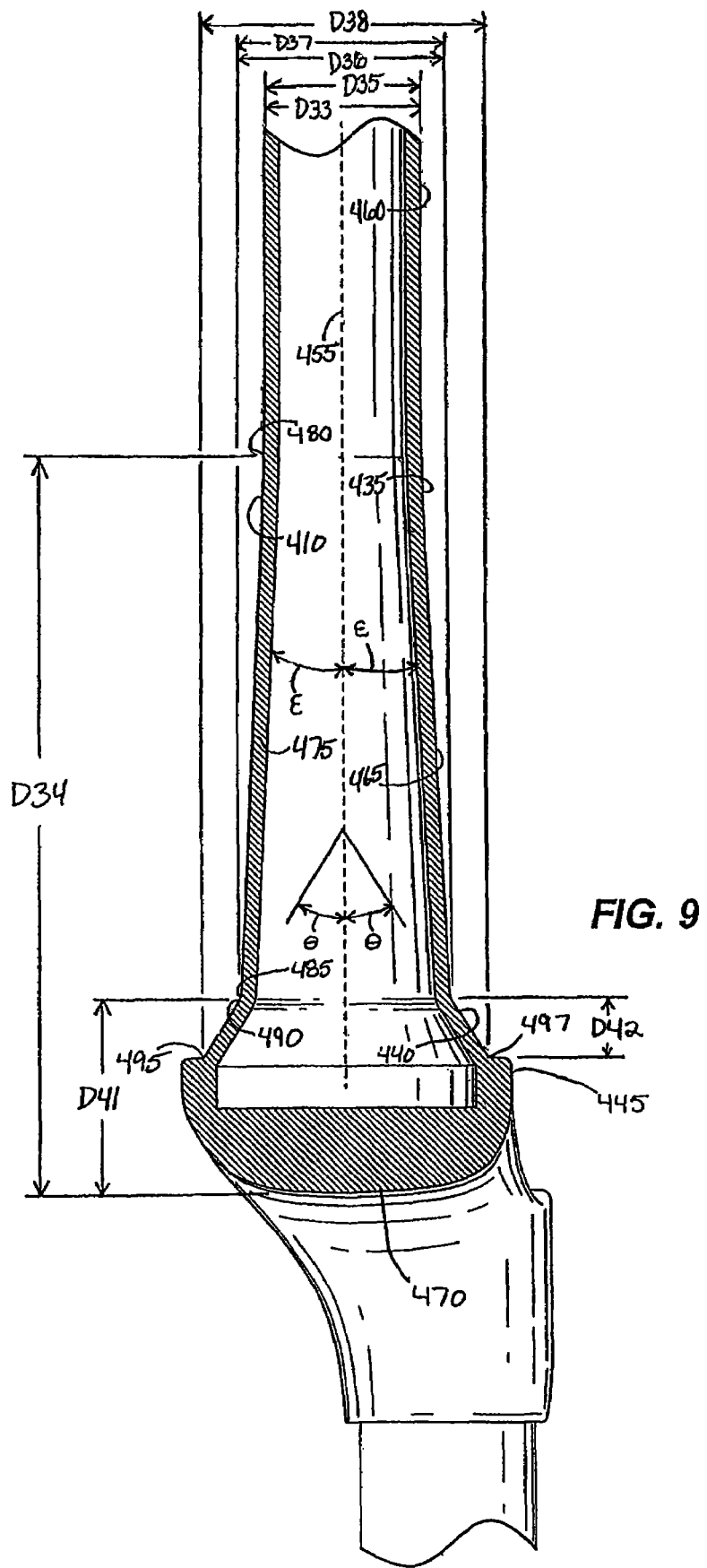
FIG. 9 is a cross-section of a portion of the fork assembly taken along line 9-9 in FIG. 8.

Referring to FIGS. 7 and 10, a fork assembly 425 is received and supported by the head tube 410. FIGS. 8 and 9 show the fork assembly 425 removed from the head tube 410. The fork assembly 425 includes a steerer tube 435, a transition 440, a fork crown 445, two fork blade assemblies 450, and wheel attachments 452. The illustrated steerer tube 435, the transition 440, the fork crown 445, the fork blade assemblies 450, and the wheel attachments 452 are integrally formed as a single piece made from a carbon/epoxy composite. Other materials such as plastics, fiberglass composite, KEVLAR composite, or other composites, and the like can be used to integrally form the steerer tube 435, the transition 440, the fork crown 445, the fork blade assemblies 450, and the wheel attachments 452. As discussed above with regard to FIGS. 1-6, in other constructions, the steerer tube 435, the transition 440, the fork crown 445, the fork blade assemblies 450, and the wheel attachments 452 may not be integrally formed as a single piece. For example, one or more of the steerer tube 435, the transition 440, the fork crown 445, the fork blade assemblies 450, and the wheel attachments 452 can formed separate from the other components, and then coupled together using an adhesive (e.g., epoxy) or other attachment methods (e.g., welding). Furthermore, one or more of the steerer tube 435, the transition 440, the fork crown 445, the fork blade assemblies 450, and the wheel attachments 452 can be made from aluminum, while the remaining components not made from aluminum can be formed from other materials, such as a composite material. Other various combinations of materials can also be utilized.

Referring to FIGS. 9 and 10, the steerer tube 435 defines a central axis 455, and is generally frustoconical in shape. The steerer tube 435 smoothly transitions or tapers from an upper portion 460 to a lower portion 465 without sharp corners in the steerer tube 435. In other constructions, the steerer tube 435 can be substantially cylindrical in shape. Furthermore, while the illustrated steerer tube 435 is hollow with a uniform wall thickness, in other constructions the wall thickness may not be uniform. For example, in other constructions the wall thickness of the steerer tube 435 can increase or decrease from the upper portion 460 toward the lower portion 465.

The fork crown 445 is in communication with the lower portion 465 of the steerer tube 4355, and includes an archway 470 disposed between the fork blades 450 to accommodate a front wheel (not shown).

The upper portion 460 includes an outer dimension D33 (28.6 mm in the illustrated embodiment). The lower portion 465 includes a taper or elongated angled portion 475 extending from the upper portion 460 of the steerer tube 435 toward the transition 440. In the illustrated construction, the taper 475 is substantially straight from the upper portion 460 to the transition 440. In other constructions, the taper 475 may be curved from the upper portion 460 to the transition 440. An outer surface of the taper 475 defines an angle $\epsilon$ between the outer surface and the central axis 455 of the steerer tube 435. The illustrated angle $\epsilon$ is about 3 degrees, and in other constructions, the angle $\epsilon$ is greater than about 5 degrees. While the illustrated taper 475 is frustoconical in shape, in other constructions, the taper 475 can have a plurality of sides.

The illustrated taper 475 includes an upper transition point 480 defined by the location where the taper 475 couples to the upper portion 460 of the steerer tube 435, and a lower transition point 485 defined by the location where the taper 475 couples to the transition 440. The upper transition point 480 is located at a distance D34 from the archway 470 (135 mm in the illustrated embodiment). In other constructions, the distance D34 can be any length. The taper 475 also has a first outer dimension D35 (29 mm in the illustrated embodiment) at the upper transition point 480, and a second outer dimension D36 (38 mm) at the lower transition point 485. In the illustrated embodiment, the first outer dimension D35 of the taper 475 is equal to the outer dimension D33 of the upper portion 460.

The transition 440 extends from the fork crown 445 to couple the fork crown 445 to the steerer tube 435, and includes an upper transition point 490 and a lower transition point 495. The upper transition point 390 is defined by the location where the transition 440 couples to the taper 475, which is the same location as the lower transition point 485 of the steerer tube 435. The lower transition point 495 is defined by the location where the transition 440 couples to the fork crown 445. The transition 440 has a first outer dimension D37 (38 mm in the illustrated embodiment) at the upper transition point 490 and a second outer dimension D38 (51 mm) where the transition 440 couples to the fork crown 445 at the lower transition point 495. While the illustrated fork 430 includes a radius portion 497 located between lower transition point 495 and the fork crown 445, in other constructions the fork 430 may omit the radius portion 497. Therefore, for purposes of this patent application, the lower transition point 495 will be defined as the point where the transition 440 couples to the radius portion 497, or in embodiments that omit the radius portion 497, the lower transition point 495 will defined as the point where the transition 440 couples to the fork crown 445.

In the illustrated embodiment, the first outer dimension D37 of the transition 440 is equal the second outer dimension D36 of the taper 475 at the upper transition point 490. A first ratio is defined by the second outer dimension D38 of the transition 440 divided by the first outer dimension D37 of the transition 440. In the illustrated construction, the ratio is about 1.34, and in other constructions the ratio is greater than about 1.30 or 1.25.

The transition 440 includes a frustoconical outer surface that defines an angle θ between the outer surface of the transition 440 and the central axis 455 of the steerer tube 435. The illustrated angle θ is about 31 degrees, and in other constructions, the angle θ is greater than about 25 or 20 or 10 degrees. While the illustrated transition 440 is frustoconical in shape, in other constructions, the transition 440 can have a plurality of sides.

Referring to FIGS. 7 and 10, the fork assembly 425 also includes an upper bearing assembly 500 and a lower bearing assembly 505. Generally, the upper bearing assembly 500 includes an upper bearing 510, a compression ring 515, and an upper cup 520, which are similar to the upper bearing 305, the compression ring 310, and the upper cup 325 of the upper bearing assembly 295 discussed above with regard to FIGS. 5 and 6. As such, the upper bearing assembly 500 will not be discussed in detail. Generally, the upper bearing 510, the compression ring 515, and the upper cup 520 are sized to accommodate the outer dimension D33 of the steerer tube 435 and an inner dimension of the head tube 410.

The lower bearing assembly 505 includes a crown race 525, a lower cup 530, and a lower bearing 535. The crown race 525 can be made from any suitable material, such as aluminum, steel, plastic, composite, etc. The crown race 525 is coupled to the fork 430 circumferentially around the upper transition point 490 such that the crown race 525 is fixed with respect to the fork 430. In the illustrated construction, the crown race 525 is co-molded to the fork 430, while in other constructions the crown race 525 can be bonded to the fork 430.

The lower cup 530 is coupled to the head tube 410 such that the lower cup 530 is fixed with respect to the head tube 410. The lower cup 530 can be made from any suitable material, such as aluminum, steel, plastic, composite, etc.

The lower bearing 535 is located the crown race 525 and the lower cup 530, such that the lower bearing 535 is circumferentially around the upper transition point 490. The lower bearing 535 can be any suitable bearing, such as a loose ball bearing, a retainer ball bearing, a cartridge type bearing, and the like. The illustrated lower bearing 535 has a diameter D39 of approximately 46 mm. In other constructions, the lower bearing 535 can have any suitable diameter D39.

The illustrated lower bearing 535 is located at a distance D40 from an end of the head tube 410. In the illustrated construction, the distance D40 is approximately 14 mm and in other constructions is at least about 8.5 mm. In yet other constructions, the lower bearing 535 can be located either above or below the upper transition point 490 of the transition 440.

The upper transition point 490 of the transition 440 and the lower bearing 535 are located at a distance D41 from the archway 470. In the illustrated embodiment, this distance D41 is 35 mm for the upper transition point 490 and 38 mm for the lower bearing 535. In addition, the upper transition point 490 and the lower bearing 535 are located at a distance D42 from the lower transition point 495 (essentially, the length of the transition 440). In the illustrated embodiment, this distance D42 is 11 mm for the upper transition point 490 and 14 mm for the lower bearing 535.

A second ratio is defined by the distance D40 from the end of the head tube 410 to the lower bearing 535 divided by the outer dimension D32 of the head tube 410. In the illustrated embodiment, the second ratio is about 0.24. In other embodiments, the second ratio is at least about 0.20 and in yet other embodiments the ratio is at least about 0.16.

A third ratio is defined by the distance D40 from the end of the head tube 410 to the lower bearing 535 divided by the diameter D39 of the lower bearing 535. In the illustrated embodiment, the third ratio is about 0.30. In other embodiments, the third ratio is at least about 0.25 and it yet other embodiments the third ratio is at least about 0.20.

A fourth ratio is defined by the distance D41 from the archway 470 to the lower bearing 535 divided by the diameter D39 of the lower bearing 535. In the illustrated embodiment, the fourth ratio is about 0.83. In other embodiments, the fourth ratio is at least about 0.77 and preferably at least about 0.70.

A fifth ratio is defined by the distance D41 from the archway 470 to the lower bearing 535 divided by the second outer dimension D38 of the transition 440 at the lower transition point 495. In the illustrated embodiment, the fifth ratio is about 0.75. In other embodiments, the fifth ratio is at least about 0.70 and preferably at least about 0.65.

A sixth ratio is defined by the distance D41 from the archway 470 to the lower bearing 535 divided by the outer dimension D32 of the head tube 410. In the illustrated embodiment, the sixth ratio is about 0.66. In other embodiments, the sixth ratio is at least about 0.60 and preferably at least about 0.54.

Attachment of the fork assembly 425 to the frame 405 and the head tube 410 is similar to the attachment of the fork assembly 215 to the frame 25 and the head tube 200 described with regard to FIGS. 5 and 6. Operation of the fork assembly 425 within the head tube 410 also is similar to operation of the fork assemblies 55, 215 described above. As such, attachment and operation of the fork assembly 215 will not be discussed in detail.

Generally, the tapered head tube 410 and the taper 475 of the steerer tube 435 provide additional rigidity and strength to the frame and the fork assembly 425, respectively. Generally, the larger lower bearing assembly 505 relative to the upper bearing assembly 500 allows the head tube 410 and the steerer tube 435 to be enlarged at its base to allow a relatively larger fork crown 445 and fork blade assemblies 450, which in turn contributes to the stiffness of the bicycle 400. The relatively small upper portions 415, 460 of the head tube 410 and the steerer tube 435, and the upper bearing 500 provide for operation of the bicycle 400 while maintaining a relatively low overall weight of the bicycle 400.

Various features and advantages of the invention are set forth in the following claims.

What is claimed is:

1. A bicycle fork and frame assembly comprising:
a frame having a head tube, the head tube having an outer dimension;
a fork including a fork crown and a steerer tube positioned in the head tube;
an upper bearing; and
a lower bearing having a diameter, the upper and lower bearings configured to rotatably support the fork within the head tube, wherein the head tube includes a first end proximal to the fork crown and a second end distal to the fork crown, and a ratio is defined by a distance from the first end of the head tube to the center of the lower bearing divided by the center diameter of the lower bearing, and wherein the ratio is at least 0.20.

2. The bicycle fork and frame assembly of claim 1, wherein the ratio is at least 0.25.

3. The bicycle fork and frame assembly of claim 1, wherein the ratio is at least 0.30.

4. The bicycle fork and frame assembly of claim 1, further comprising a transition coupling the fork crown to the steerer tube and defining a transition point between the transition and the steerer tube, wherein the transition has an outer dimension that increases from the steerer tube toward the fork crown, and wherein the lower bearing is located adjacent to the transition point.

5. The bicycle fork and frame assembly of claim 4, wherein an outer dimension of the steerer tube at the transition point and an outer dimension of the transition at the transition point are substantially the same.

6. The bicycle fork and frame assembly of claim 4, wherein the steerer tube and the fork crown are an integrally formed piece of composite material.

7. The bicycle fork and frame assembly of claim 4, wherein the steerer tube includes:
 a lower section coupled to an upper part of the transition at the transition point, the lower section having an outer dimension that tapers smaller moving away from the transition; and
 an upper section coupled to the lower section and having a substantially constant cross section.

8. The bicycle fork and frame assembly of claim 1, wherein the fork crown defines an arch way, wherein the arch way is a second distance from the lower bearing, wherein a ratio is defined as the second distance divided by the diameter of the lower bearing, and wherein the ratio is at least 0.7.

9. A bicycle comprising:
 a frame having a head tube;
 a fork including:
  a fork crown defining an arch way;
  a transition coupled to an upper part of the fork crown; and
  a steerer tube having a lower section coupled to an upper part of the transition at a transition point, the lower section having an outer dimension that tapers smaller moving away from the transition, the steerer tube further including an upper section coupled to the lower section and having a substantially constant cross section;
 a lower bearing having a diameter and being recessed within the head tube, the lower bearing configured to rotatably support the fork within the head tube; and
 a lower bearing race positioned substantially at the transition point,
 wherein the arch way is a distance from the lower bearing, wherein a ratio is defined as the distance divided by the diameter of the lower bearing, and wherein the ratio is at least 0.7.

10. The bicycle of claim 9, wherein the ratio is at least 0.77.

11. The bicycle of claim 10, wherein the ratio is at least 0.83.

12. A fork assembly comprising:
 a fork crown;
 a transition coupled to an upper part of the fork crown;
 a steerer tube including:
  a lower section coupled to an upper part of the transition at a transition point, the lower section having an outer dimension that tapers smaller moving away from the transition; and
  an upper section coupled to the lower section and having a substantially constant cross section; and
 a lower bearing race positioned substantially at the transition point.

13. The fork assembly of claim 12, wherein the lower section is substantially frusto-conical in shape.

14. The fork assembly of claim 13, wherein the steerer tube defines an axis, wherein the lower section includes side walls positioned at a half angle of at least 2 degrees relative to the axis.

15. The fork assembly of claim 12, wherein the upper section is substantially cylindrical in shape.

16. The fork assembly of claim 12, wherein the transition is substantially frusto-conical in shape.

17. The fork assembly of claim 16, wherein the steerer tube defines an axis, wherein the transition includes side walls positioned at a half angle of at least 10 degrees relative to the axis.

* * * * *